United States Patent
Krstic

(10) Patent No.: US 7,089,690 B2
(45) Date of Patent: Aug. 15, 2006

(54) MATERIAL HAVING COMPRESSIBLE PROJECTIONS AND FOOTWEAR INCORPORATING THE MATERIAL

(75) Inventor: Ruzica Krstic, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 10/158,204

(22) Filed: May 29, 2002

(65) Prior Publication Data

US 2003/0221336 A1    Dec. 4, 2003

(51) Int. Cl.
*A43B 13/20* (2006.01)
*A43B 7/08* (2006.01)
*A43B 7/14* (2006.01)
*A61F 5/14* (2006.01)

(52) U.S. Cl. ............... 36/29; 36/88; 36/3 R; 36/141
(58) Field of Classification Search ............... 36/29, 36/55, 88, 93, 3 A, 3 R, 8.1, 71, 141, 28
See application file for complete search history.

(56) References Cited

U.S. PATENT DOCUMENTS

| | | | |
|---|---|---|---|
| 641,642 A | | 1/1900 | Gunn |
| 2,090,881 A | * | 8/1937 | Wilson ............ 36/29 |
| 2,607,133 A | | 8/1952 | Marlowe |
| 3,231,454 A | * | 1/1966 | Williams ............ 36/3 R |
| 3,589,037 A | * | 6/1971 | Gallagher ............ 36/44 |
| 3,686,777 A | | 8/1972 | Rosen |
| 4,112,599 A | * | 9/1978 | Krippelz ............ 36/3 R |
| 4,342,158 A | | 8/1982 | McMahon et al. |
| 4,356,642 A | * | 11/1982 | Herman ............ 36/44 |
| 4,391,048 A | | 7/1983 | Lutz |
| 4,553,342 A | | 11/1985 | Derderian et al. |
| 4,858,340 A | | 8/1989 | Pasternak |
| 4,967,492 A | | 11/1990 | Rosen |
| 5,060,402 A | | 10/1991 | Rosen |
| 5,193,246 A | | 3/1993 | Huang |
| 5,238,231 A | | 8/1993 | Huang |
| 5,241,762 A | | 9/1993 | Rosen |
| 5,274,846 A | * | 1/1994 | Kolsky ............ 2/460 |
| 5,325,614 A | | 7/1994 | Rosen |
| 5,335,382 A | | 8/1994 | Huang |
| 5,404,658 A | | 4/1995 | Rosen |
| 5,454,142 A | | 10/1995 | Neely et al. |
| 5,607,749 A | * | 3/1997 | Strumor ............ 36/29 |
| 5,729,912 A | | 3/1998 | Gutkowski et al. |
| 5,731,062 A | | 3/1998 | Kim et al. |
| 5,784,807 A | * | 7/1998 | Pagel ............ 36/29 |
| 5,894,687 A | * | 4/1999 | Lin ............ 36/141 |
| 5,896,680 A | | 4/1999 | Kim et al. |

(Continued)

OTHER PUBLICATIONS

HK Metalcraft Manufacturing Corporation website page entitled "Belleville Spring Washers," downloaded on May 9, 2001.

(Continued)

*Primary Examiner*—Anthony Stashick
(74) *Attorney, Agent, or Firm*—Banner & Witcoff, Ltd.

(57) ABSTRACT

The present invention relates to a material with a substrate and a plurality of compressible projections connected to the substrate. The projections may be formed in a thermoplastic substrate to have a variety of shapes, including a shape that defines a base portion and a spring portion. The spring portion may have a structure of a belleville spring that exhibits a non-linear and bi-stable response to compressive forces. The material may be incorporated into an upper for an article of footwear, thereby providing the footwear with enhanced fit and comfort characteristics.

25 Claims, 7 Drawing Sheets

U.S. PATENT DOCUMENTS

| | | | | |
|---|---|---|---|---|
| 6,006,448 A | * | 12/1999 | Hellman | 36/29 |
| 6,029,962 A | | 2/2000 | Shorten et al. | |
| 6,098,313 A | * | 8/2000 | Skaja | 36/29 |
| 6,161,240 A | | 12/2000 | Huang | |
| 6,226,898 B1 | * | 5/2001 | Trimble et al. | 36/10 |
| 6,230,501 B1 | | 5/2001 | Bailey, Sr. et al. | |
| 6,434,859 B1 | * | 8/2002 | Kim | 36/3 B |

OTHER PUBLICATIONS

West Coast Lockwasher Company website pages entitled "Belleville Disc Springs," downloaded on May 9, 2001 (pp. 95 and 96).

* cited by examiner

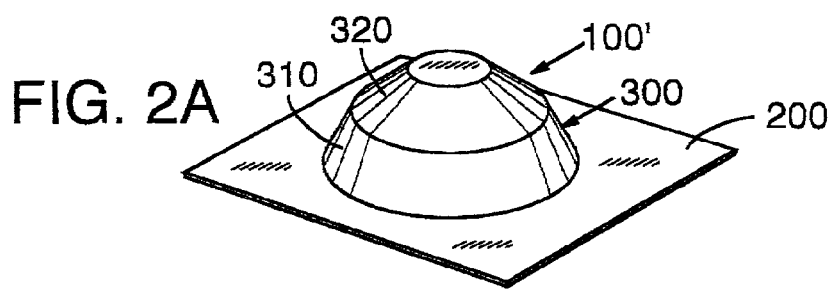
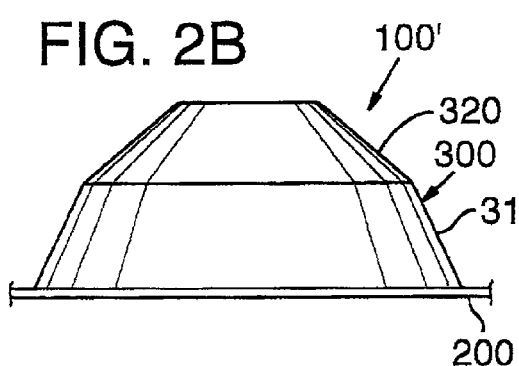
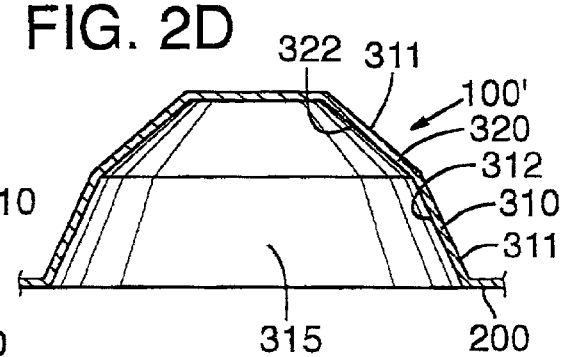
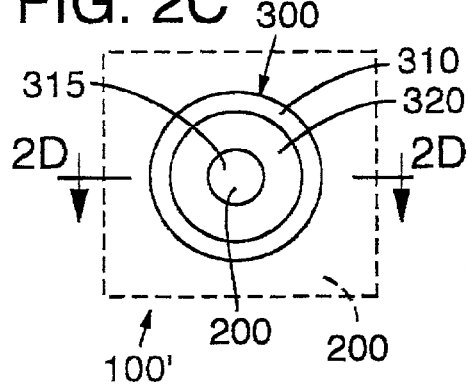
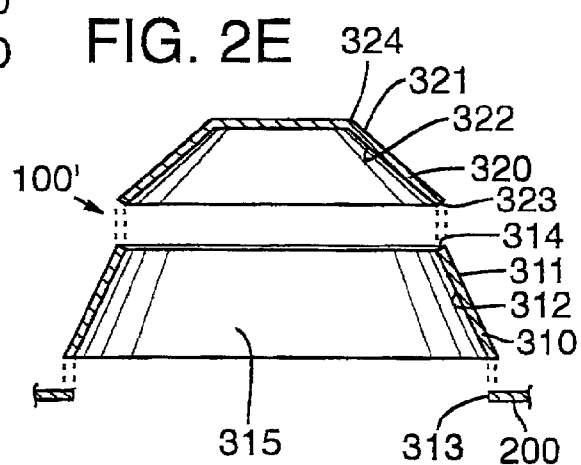

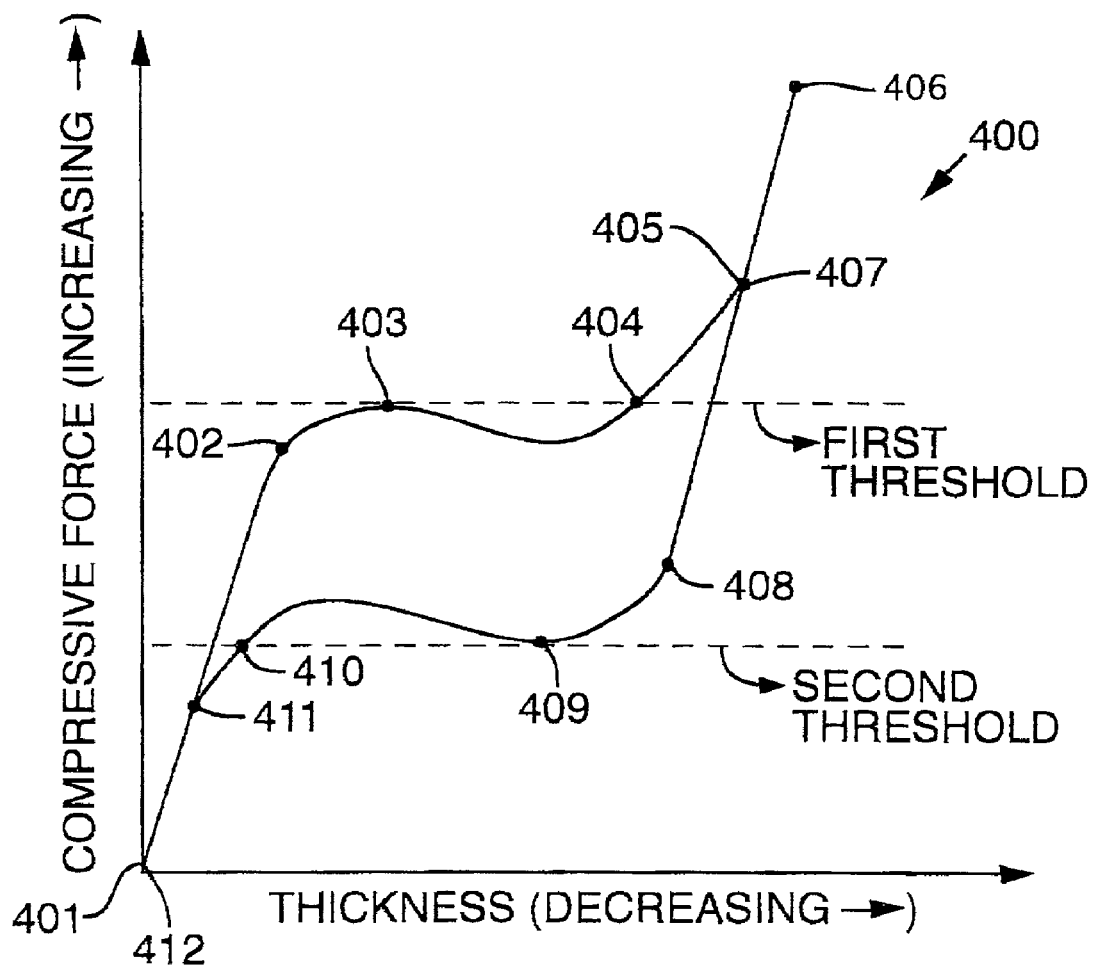

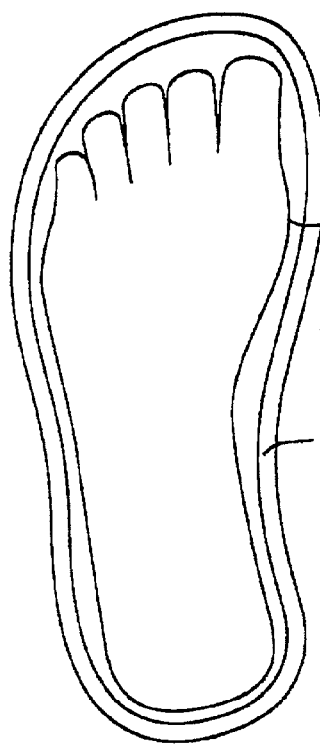
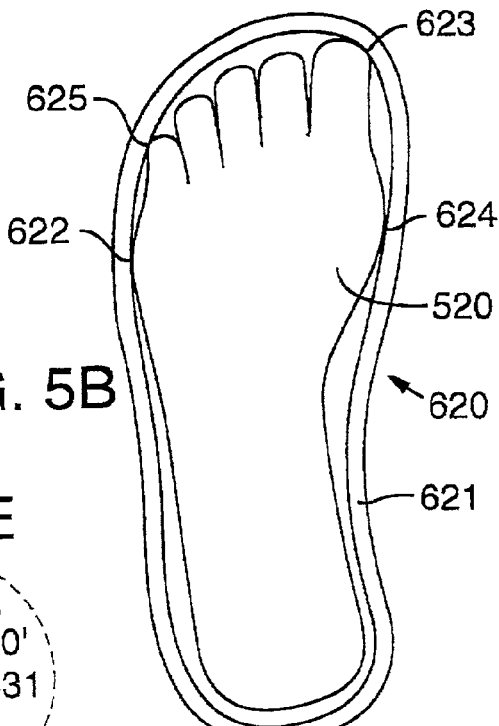
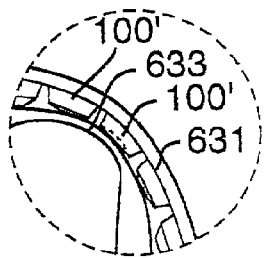
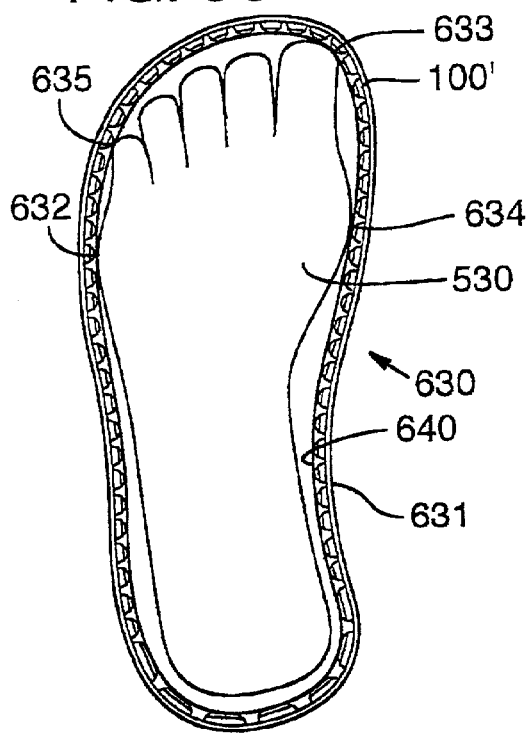
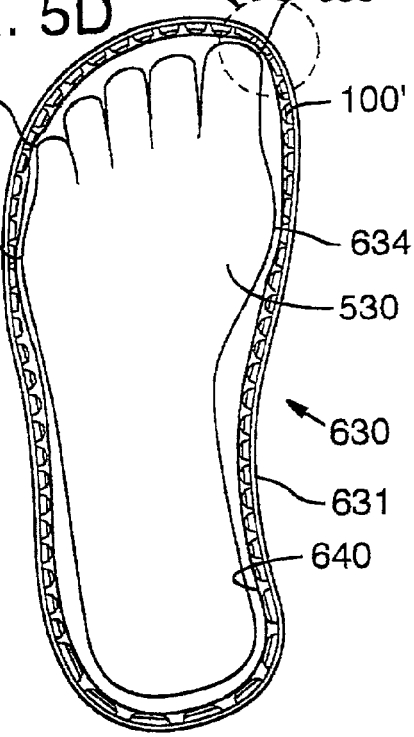

US 7,089,690 B2

MATERIAL HAVING COMPRESSIBLE PROJECTIONS AND FOOTWEAR INCORPORATING THE MATERIAL

BACKGROUND OF THE INVENTION

1. Field of the Invention

The present invention relates to a compressible material suitable for use in a footwear upper. The invention concerns, more particularly, a material formed from thermoplastic sheet with a plurality of compressible projections formed in the sheet.

2 Description of Background Art

Modem athletic footwear is generally fitted to specific individuals based solely upon the overall length of the foot. Foot dimensions, however, vary between individuals in respects that are not accounted for by considering length alone. As a result, many individuals may select improperly-fitted articles of athletic footwear that have the potential to cause discomfort or impair athletic performance.

The fit of an article of footwear is primarily influenced by the shape of the last upon which the footwear is formed. In creating a last, primary importance is given to foot measurements that include the overall length of the foot, width of the foot, height of the first digit, contour of the instep, and at least six girth measurements. In shaping a last for the manufacture of mass-produced footwear, designers utilize foot measurements from a broad spectrum of the population to determine the characteristics of a statistically-average foot. The measurements that comprise the statistically-average foot are then used to shape a last that theoretically achieves a proper fit for a majority of the population. Many individuals, however, do not have a foot with statistically-average proportions and would obtain benefits from footwear that accommodates their unique proportions. For the majority of these individuals, footwear that is offered in a variety of length-width combinations would provide a sufficient fit.

The primary factors that effectively prohibit manufacturers from offering footwear sizes in a variety of length-width combinations relate to manufacturing costs and retail inventory. Each length-width combination for an article of footwear generally requires a unique last that is proportioned for the specific length-width combination. In addition to the cost of generating a relatively large number of lasts, further expenditures are required to alter the manufacturing system each time a different length-width combination is manufactured. Such costs are generally reflected in the final price of the footwear and may make the footwear prohibitively expensive when compared to the cost of similar footwear that is not offered in a variety of widths. With regard to retail inventory, the cost of acquiring footwear in multiple length-width combinations and storing the inventory until sale effectively prohibits at least the smaller retailers from offering various length-width combinations. To ensure availability of specific sizes of footwear, retailers often purchase numerous pairs of footwear for each size. When the typical inventory requirements are further multiplied by numerous widths, the size of the required inventory becomes increasingly large. Accordingly, both manufacturing costs and limitations upon retail inventory effectively prohibit many footwear manufacturers from offering a variety of widths for each size.

In order to accommodate individuals that do not have feet with statistically-average proportions, some prior art footwear designs incorporate fit features that are adjustable. The prior art designs exhibit both automatic and manual mechanisms that permit adjustment of fit factors. An automatic mechanism adjusts by utilizing the pressure of the foot against the interior of the shoe. Usually adjusting for width, the typical automatic mechanism permits a vertical deformation of the upper to translate into a horizontal increase in width. Examples of patents displaying automatic mechanisms include U.S. Pat. No. 5,404,658 to Rosen; 5,325,614 to Rosen; U.S. Pat. No. 5,241,762 to Rosen; U.S. Pat. No. 5,060,402 to Rosen; U.S. Pat. No. 4,967,492 to Rosen; and U.S. Pat. No. 4,858,340 to Pasternak. Manual mechanisms require the wearer to adjust fit through means that include lacing systems, as in U.S. Pat. No. 4,553,342 to Derderian et al. and U.S. Pat. No. 641,642 to Gunn, or screw adjustments, as in U.S. Pat. No. 4,391,048 to Lutz; U.S. Pat. No. 3,686,777 to Rosen; 2,607,133 to Marlowe; and U.S. Pat. No. 5,729,912 to Gutkowski et al.

Although the prior art succeeds in supplying means for adjusting fit factors, many of the prior art designs are not suitable for athletic footwear. Athletic footwear requires an adjustment means that permits fit to be adjusted in specific, localized regions of the footwear. The adjustment mechanisms of the prior art, however, are generally not capable of providing specific, localized fit adjustment.

BRIEF SUMMARY OF THE INVENTION

The present invention is a material formed of a sheet of thermoplastic material that defines a plurality of compressible projections. Each of the projections is compressible and substantially returns to an uncompressed configuration following a compression. The material may be incorporated into an upper of an article of footwear, for example, such that the foot may contact and compress a portion of the material. Upon contact with the foot, the projections located in the area of the contact will compress, thereby enhancing the fit and comfort characteristics of the footwear.

The projections may have a variety of shapes, including the shape of a dome, a cone, a truncated cone, a cube, a pyramid, a cylinder, or a sphere for example. In addition, the projections may have a shape that includes a base portion and a spring portion, the spring portion having the configuration of a belleville spring. Projections with a belleville spring structure impart a unique response to compressions, wherein the material (a) has a first thickness when a compressive force acting upon the material is less than a first threshold; (b) converts to a second thickness, which is less than the first thickness, when the compressive force is above the first threshold; (c) remains at the second thickness when the compressive force is reduced below the first threshold, but remains above a second threshold; and (d) returns to the first thickness when the compressive force is reduced below the second threshold.

In order to achieve the response described above, the base portion includes a recess and the spring portion has the configuration of a belleville spring. Initially, the thickness of the material is the first thickness, which is the combined thicknesses of the substrate, base portion, and spring portion. When the compressive force exceeds the first threshold, the spring portion deforms into the recess and the thickness of the material is reduced to the second thickness. The second thickness is approximately the first thickness minus the individual thickness of the spring portion. A material with projections having the belleville spring structure may be incorporated into an upper of an article of footwear such that the fit of the footwear adjusts in specific, localized regions. When substantial, direct contact occurs between a portion of the foot and the footwear, the portion of the material located adjacent to the region of contact converts from the first thickness to the lesser, second thickness, thereby providing extra space for the foot in a localized portion of the footwear.

The advantages and features of novelty that characterize the present invention are pointed out with particularity in the appended claims. To gain an improved understanding of the advantages and features of novelty that characterize the present invention, however, reference may be made to the descriptive matter and accompanying drawings that describe and illustrate various embodiments of the invention.

BRIEF DESCRIPTION OF THE DRAWINGS

FIG. 2A is a perspective view of a material that includes a belleville spring structure.

FIG. 2B is a side elevation view of the material depicted in FIG. 2A.

FIG. 2C is a plan view of the material depicted in FIG. 2A.

FIG. 2D is a cross-sectional side view of the material, as defined by line 2D—2D in FIG. 2C.

FIG. 2E is an exploded view of the cross-section depicted in FIG. 2D.

FIG. 4 is a graph that depicts the load-deflection response of the material of the present invention.

FIG. 5A is a cross-sectional, schematic plan view of a foot located within a properly-fitted article of footwear.

FIG. 5B is a cross-sectional, schematic plan view of a foot located within an improperly-fitted article of footwear.

FIG. 5C is a cross-sectional, schematic plan view of a foot located within an article of footwear that incorporates the material of the present invention.

FIG. 5D is a second cross-sectional, schematic plan view of the foot and article of footwear depicted in FIG. 5C.

FIG. 5E is a view of a portion of the cross-section depicted in FIG. 5D.

DETAILED DESCRIPTION OF THE INVENTION

Figure 1A:
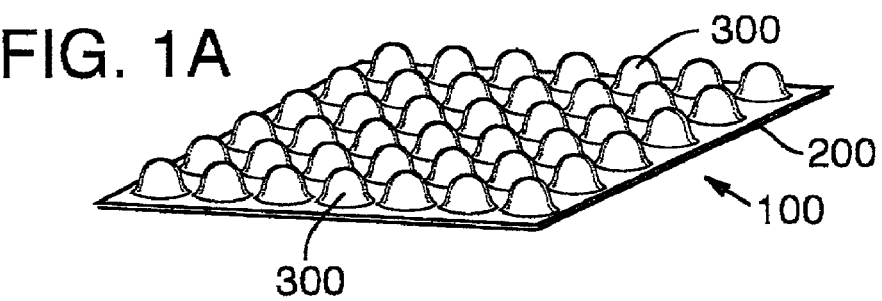
FIG. 1A is a perspective view of a compressible material in accordance with the present invention.

Referring to the figures, wherein like numerals indicate like elements, an article of material 100 in accordance with the present invention is disclosed. Material 100 may be incorporated into a plurality of products where localized fit adjustment or enhanced comfort would be beneficial, including an upper of an article of footwear, apparel, and sporting equipment. Referring to FIG. 1A, material 100 includes a substrate 200 and one or more projections 300 that are distributed over at least one surface of substrate 200.

Projections 300 are compressible structures that may be formed integral with substrate 200 or formed separate from substrate 200 and subsequently attached. In one embodiment of the present invention, substrate 200 and projections 300 are formed from a sheet of thermoplastic material. Accordingly, specific areas of the thermoplastic material may be heated and stretched to define a plurality of projections 300 formed integral with substrate 200. In another embodiment of the present invention, a plurality of individual projections 300 may be separately formed and attached to a substrate 200. For example, a plurality of projections 300 may be attached to an interior surface of a conventional article of footwear to improve the comfort characteristics or fit of the footwear.

The thickness of material 100 may be altered through the application of a compressive force. In general, the thickness of material 100 is measured in a direction perpendicular to substrate 200. That is, the thickness of material 100 is the combined thickness of substrate 200 and the height of projections 300. In the absence of a compressive force, material 100 has a first thickness. When a sufficient compressive force is applied to material 100, however, projections 300 collapse, thereby decreasing the height of projections 300 and reducing the thickness of material 100. More particularly, when a compressive force is applied to a localized area of material 100, the projections 300 that are positioned within the localized area collapse to provide material 100 with a lesser second thickness in the areas of the collapsed projections 300. The degree to which projections 300 collapse may range from approximately 5% of their total height to 95% of their total height depending upon factors that include, the dimensions of the various portions of projections 300, the flexibility of the material forming projections 300, and the wall thickness of projections 300, for example.

Figure 1B:
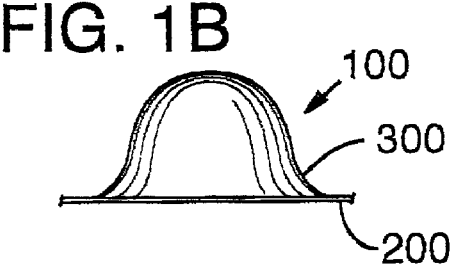
FIG. 1B is a side elevation view of the material that depicts a projection having a shape of a dome.
Figure 1C:
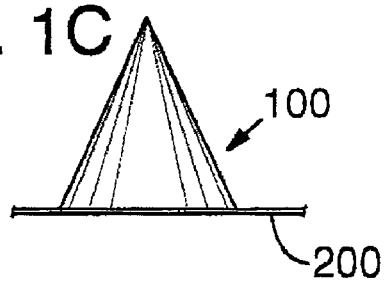
FIG. 1C is a side elevation view of the material that depicts a projection having a shape of a cone.
Figure 1D:
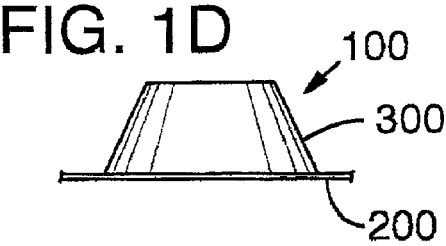
FIG. 1D is a side elevation view of the material that depicts a projection having a shape of a truncated cone.
Figure 1E:
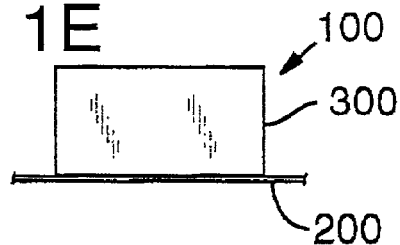
FIG. 1E is a side elevation view of the material that depicts a projection having a shape of a box.
Figure 1F:
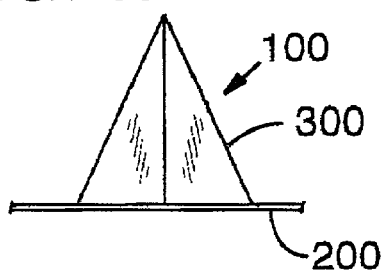
FIG. 1F is a side elevation view of the material that depicts a projection having a shape of a pyramid.
Figure 1G:
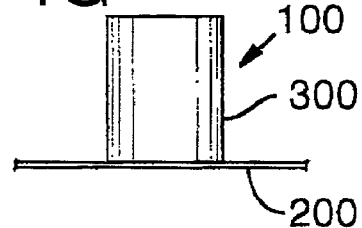
FIG. 1G is a side elevation view of the material that depicts a projection having a shape of a cylinder.

As depicted in FIGS. 1A and 1B, projections 300 have a dome-shaped configuration. Each projection 300 may have a variety of other configurations within the scope of the present invention, including the shape of a cone, a truncated cone, a box, a pyramid, or a cylinder, as depicted in FIGS. 1C to 1G, respectively. In addition, projections 300 may have a non-regular shape. Accordingly, suitable shapes for projections 300 may range from non-geometrical to prismatic to spherical, for example. Projections 300 may also include a belleville spring structure, as discussed in greater detail below. The specific shape selected for projections 300, however, should have a collapsible configuration that promotes a reduction in the thickness of material 100 in the presence of a compressive force.

Substrate 200 and projections 300 may be formed from a variety of materials, including a woven or non-woven fabric, a textile formed of synthetic or natural materials, or a thermoplastic sheet. Suitable thermoplastics will generally have a hardness that ranges from approximately 70 on a Shore A scale to approximately 55 on a Shore D scale.

Thermoplastic polyurethanes of the polyether or polyester type may be utilized. In addition, aliphatic polyurethanes may be utilized and provide the benefits of high clarity and resilience. Specific suitable polyurethanes include the TEXIN and DESMOPAN series of polymers manufactured by Bayer Corporation, and the PELLETHANE series of polymers manufactured by Dow Chemicals. Another thermoplastic that is suitable for material 100 is polyether block amide, as manufactured by Atochem under the PEBAX tradename. In addition, block copolymers of polybutylene terephthalate and long chain polyether glycols, such as HYTREL, which is manufactured by DuPont de Nemours and Company, may be utilized. Accordingly, the specific materials utilized for material 100 may vary significantly within the scope of the present invention.

Material 100 may be incorporated into a footwear upper, for example. Conventional articles of footwear have uppers that are formed of multiple layers of foam and textile materials that are stitched and adhesively bonded together. Material 100, however, requires fewer manufacturing steps and fewer types of materials. An advantage of utilizing material 100 over conventional upper materials, therefore, is the relative simplicity with which material 100 may be manufactured and incorporated into a footwear upper. Furthermore, material 100 may be formed of a thermoplastic material that is recyclable. The foam materials that are utilized in conventional uppers, however, are formed of a thermoset polymer that is generally not recyclable.

In any article of footwear having, the foot makes contact with the upper as the foot moves through a range of motions. A conventional upper has the potential to contact and place relatively great pressure upon specific portions of the foot, particularly when the footwear is not properly fitted to the individual. Contact between the foot and the upper may result chafing, blisters, or discomfort. In an article of footwear that incorporates material 100, however, projections 300 will compress to provide localized fit adjustment or enhanced comfort. More particularly, the portions of the foot that make contact with the upper will cause corresponding projections 300 to collapse. An upper that incorporates material 100 may, therefore, reduce the probability that chafing, blisters, or discomfort will result during wear.

Projections 300 may have a variety of configurations, as discussed above. Referring to FIG. 2, a material 100' wherein projections 300 include a base portion 310 that is connected to substrate 200 and a spring portion 320 that is connected to base portion 310 opposite substrate 200 is disclosed. For purposes of the present discussion, the term "connected" is intended to encompass two distinct circumstances: The first circumstance is where a first element is formed separate from a second element and subsequently attached. The second circumstance is where a first element is formed integral with a second element. Accordingly, base portion 310 may be formed separate from substrate 200 and then attached to substrate 200 using an adhesive or thermobonding process, for example. In the alternative, base portion 310 may be formed integral with substrate 200 such that no subsequent attachment is necessary. Similarly, spring portion 320 may be formed separate from base portion 310 and subsequently attached to base portion 310. Alternatively, spring portion 320 may be formed integral with base portion 310.

Base portion 310 generally has the configuration of a hollow, truncated cone. That is, base portion 310 has the configuration of a hollow cone in which the pointed portion is absent. Accordingly, base portion 310 is characterized by an exterior surface 311, an opposite interior surface 312, a first edge 313 that is connected to substrate 200, and an opposite second edge 314 that is connected to spring portion 320 and has a lesser diameter than first edge 313. The volume bounded by interior surface 312, the plane of first edge 313, and the plane of second edge 314 defines a recess 315 located on the interior of base portion 310. In the first embodiment, base portion 310 slopes inward such that first edge 313 has a greater diameter than second edge 314. In alternate embodiments, base portion 310 may have a variety of diverse configurations. For example, edges 313 and 314 may have the same diameter; second edge 314 may have a greater diameter than first edge 313; one of edges 313 or 314 may have a non-circular shape; both edges 313 and 314 may have a non-circular shape; or base portion 310 may bow inward or outward between edges 313 and 314. Accordingly, the configuration of base portion 310 is variable, but, regardless of configuration, base portion 310 should provide a means, such as recess 315, for permitting spring portion 320 to deflect in the direction of substrate 200, as described below, thereby permitting the thickness of material 100' to be reduced.

Spring portion 320 also has the configuration of a hollow, truncated cone. More particularly, however, spring portion 320 has the configuration of a belleville spring, otherwise known as a dished or conical spring. Accordingly, spring portion 320 is characterized by an exterior surface 321, an opposite interior surface 322, a third edge 323 that is connected to second edge 314 of base portion 310, and an opposite fourth edge 324 that defines the portion of projection 300 furthest from substrate 200. Spring portion 320 may be configured such that fourth edge 324 defines an opening. Alternatively, a surface located on the plane of fourth edge 324 may be added to prevent debris from entering projection 300. In alternate embodiments, spring portion 320 may have a variety of configurations that exhibit the specialized response to a compressive force described below.

Belleville springs provide an unusual spring rate when compared to helical springs. In general, a belleville spring reacts to a compressive force as follows: At a relatively low compressive force, the belleville spring deflects linearly, thereby resisting significant deformation. As the compressive force increases to a first threshold level, the belleville spring exhibits a snap-through action wherein the truncated cone-shape of the belleville-spring is essentially turned inside out (i.e., the edge with lesser diameter deforms through the edge with greater diameter such that the exterior surface becomes the interior surface for purposes of the deformed configuration). The belleville spring then remains in the deformed configuration until the compressive force is reduced to a second threshold level, the second threshold level being less than the first threshold level. When the compressive force is reduced below the second threshold level, the belleville spring deforms back to the original configuration.

The structure of material 100', when incorporating projections 300 that have a belleville spring structure, provides a specialized response to compression. Material 100' has a first thickness in the absence of a compressive force. When a compressive force is applied to material 100' and increased to a first threshold, the portion of material 100' to which the compressive force is applied converts to a material having a second thickness, the second thickness being less than the first thickness. Material 100' remains at the second thickness even when the compressive force is reduced below the first threshold. When the compressive force is reduced below a second threshold, the second threshold being less than the first threshold, material 100' returns to the first thickness, thereby returning to its original configuration.

Referring to FIG. 3, the response of material 100' to a compressive force will be described in greater detail. Material 100' has a first thickness when no compressive force is applied (see FIG. 3A). Note that the thickness of material 100' includes the individual thicknesses of substrate 200, base portion 310, and spring portion 320. When a relatively low compressive force 330 is applied to spring portion 320 (see FIG. 3B), the thickness of material 100 decreases proportionally. The decrease in thickness, however, is relatively small, as will become apparent from the following discussion. When compressive force 330 is increased to a first threshold, spring portion 320 deforms into recess 315 of base portion 310 (see FIG. 3C), thereby substantially decreasing the thickness of material 100'. That is, spring portion 320 deforms such that fourth edge 324 and a majority of exterior surface 321 and interior surface 322 are located within recess 315. Accordingly, the thickness of material 100' is decreased by an amount approximately equal to the individual thickness of spring portion 320. Note that the deflection (decrease in thickness) of material 100' which occurs between FIGS. 3A and 3B is substantially less than the deformation that occurs between FIGS. 3B and 3C. In response to further increases in compressive force 330, material 100' continues to deflect, but the deflection is relatively small (see FIG. 3D).

Figure 3A:
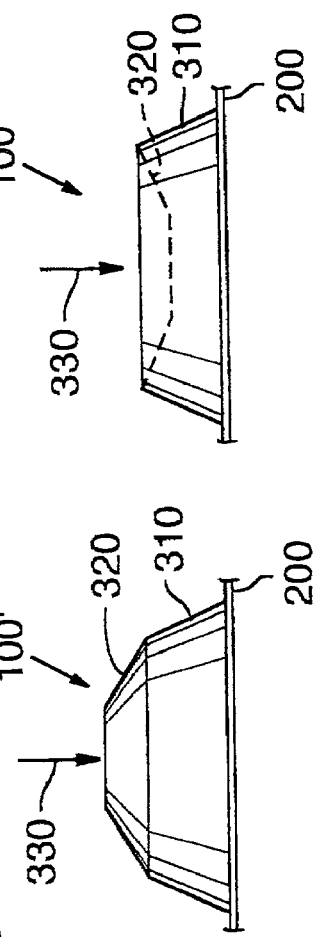
FIGS. 3A–3G depict various configurations of the projection of FIG. 2.
Figure 3B:
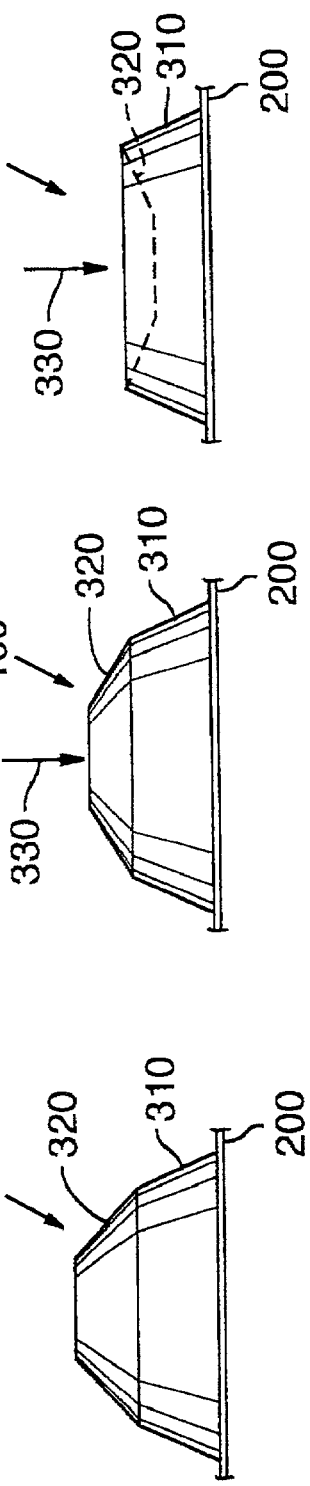
Figure 3C:
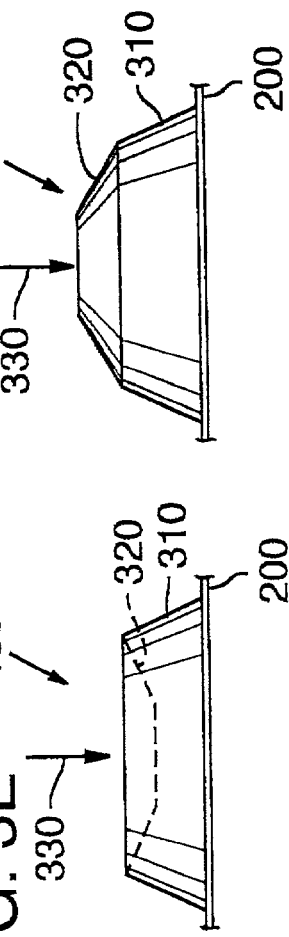
Figure 3D:
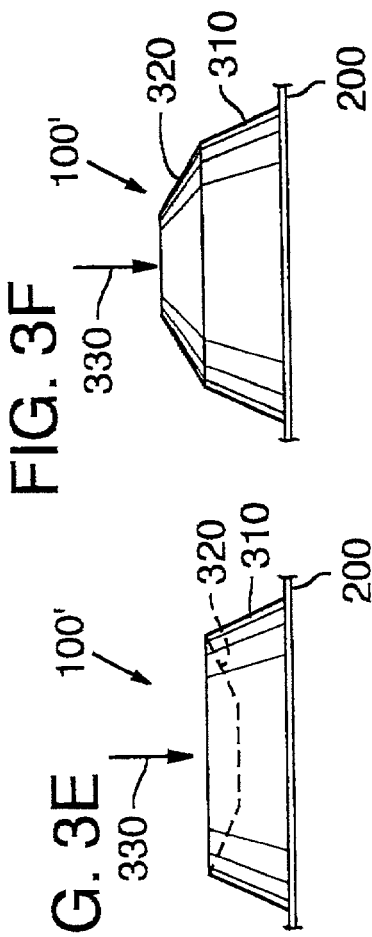
Figure 3E:
Figure 3F:
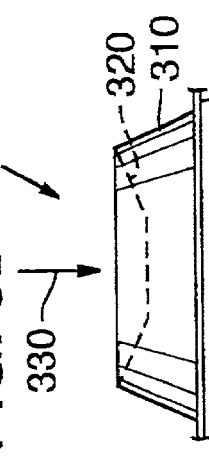
Figure 3G:
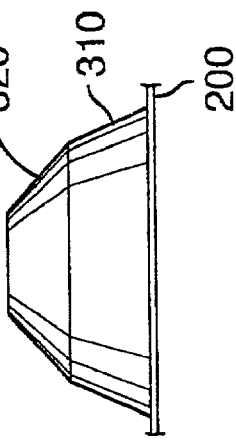

The thickness of material 100' increases in response to a reduction in compressive force 330. When the compressive force is less than the first threshold, spring portion 320 remains in the deformed configuration so long as compressive force 330 is above a second threshold (see FIG. 3E), the second threshold being less than the first threshold. When compressive force 320 is reduced to the second threshold, spring portion 320 deforms in the reverse direction such fourth edge 324, exterior surface 321, and interior surface 322 are again outside of recess 315 (see FIG. 3F). Note that the deflection (increase in thickness) of material 100' which occurs between FIGS. 3D and 3E is substantially less than the deformation that occurs between FIGS. 3E and 3F. As compressive force 330 is reduced to zero, material 100' returns to the initial configuration (see FIG. 3G).

To further understand the complex relationship between the compressive force and the thickness of material 100', refer to the graphical depiction of FIG. 4. Graph 400 illustrates the relationship between a compressive force acting upon material 100' and the associated thickness of material 100'. Distance along the y-axis represents an increasing compressive force, whereas distance along the x-axis represents a decrease in the thickness of material 100'. From the general character of the graph, it is apparent that material 100' exhibits a non-linear and bi-stable response (i.e., a hysteresis-type response) to a compressive force.

Point 401 (wherein material 100' has the configuration of FIG. 3A) represents an initial condition wherein material 100' is not subjected to a compressive force. As compressive force increases between points 401 and 402, the thickness of material 100' decreases proportionally (see FIG. 3B). Note that the response of material 100' between points 401 and 402 has a substantially constant, linear slope through this region. The slope of a line on a force versus deflection graph corresponds to the modulus of elasticity of the material represented by the line. In practical terms, the modulus of elasticity refers to the rigidity of a material. Accordingly, the linear response of material 100' between points 401 and 402 indicates a constant modulus of elasticity for compressive forces up to point 402. Note that the line between points 401 and 402 has a relatively steep slope. Accordingly, relatively large increases in compressive force are associated with relatively small decreases in thickness for conditions between points 401 and 402.

Beyond point 402, the line curves right, thereby indicating a reduced modulus of elasticity. Accordingly, an increase in compressive force translates into a greater decrease in thickness for material 100' between points 402 and 403. At point 403, which lies on the level of the first threshold compressive force, the slope of the force versus deflection line is approximately horizontal. Between points 403 and 404, thickness continues to decrease without the application of an additional compressive force. That is, spring portion 320 deflects downward so as to be located within base portion 310, thereby exhibiting a snap-through action. At point 404 (see FIG. 3C), however, the decrease in thickness without the application of an additional compressive force ceases until the compressive force is increased beyond the first threshold level. As the compressive force exceeds point 405, the slope of the response again becomes linear, thereby indicating a constant modulus of elasticity for all compressive forces in excess of the compressive force at point 405 (see FIG. 3D).

For purposes of this example, the compressive force continues linearly to the level of point 406 and is then decreased as described below. Between points 406 and 407, the response of material 100' coincides with the line generated by the increase in compressive force. At point 407, the decreasing line diverges from the increasing line. Note that the slope of the line between points 407 and 408 (see FIG. 3E) is linear and relatively steep, thereby indicating that the increase in thickness of material 100' through this region is small in relation to the associated decrease in compressive force. Beyond point 408, the thickness of material 100' continues to increase, but the increase in thickness is at an increasing rate with respect to decreases in compressive force. At point 409, the slope is approximately horizontal and the compressive force reaches a second threshold level. Between points 409 and 410, the thickness of material 100' continues to increase despite a constant compressive force. At point 410 (see FIG. 3F), however, the increase in thickness ceases until the compressive force is reduced beyond the second threshold. At point 411, the response of material 100' coincides with the line generated by the increase in compressive force and the modulus of elasticity again becomes constant. At point 412 (see FIG. 3G) all compressive force is removed and thickness returns to the initial condition.

As stated above, material 100' exhibits a non-linear and bi-stable response to a compressive force. The response is non-linear due to the reactions that occur between points 402 and 405 and between points 408 and 411. Many styles of springs, including helical springs, exhibit linear responses for all non-extreme compressive forces. Additionally, the response of material 100' is bi-stable due to the non-coincident return path between points 407 and 411. With regard to helical springs, points on the force-deflection line for increasing force coincide substantially with the force-deflection line for decreasing force. Accordingly, material 100' exhibits a non-linear and bi-stable response as a result of the properties imparted by spring portion 320.

The application in which material 100' is intended to be used is the primary factor which determines the dimensions of individual projections 300 and material from which projections 300 are fashioned. One suitable application for material 100' is an upper for an article of footwear. As will be discussed in greater detail below, changes in the thickness of material 100' may be utilized to provide the foot with greater space within specific portions of an article of footwear, thereby enhancing comfort and fit. Accordingly, one skilled in the art will recognize that the dimensions and material from which projections 300 are formed should be such that (a) the first threshold compressive force is not achieved when the foot merely makes contact with the footwear, but (b) the first threshold compressive force is achieved prior to contact forces that may cause discomfort, chafing, or blisters.

The design of material 100' may also be such that projections 300 in different portions of material 100' have different dimensions or material properties. When material 100' is incorporated into footwear, the first threshold compressive force in the toe region, for example, may be designed to be less than the first threshold compressive force in the heel region. Variations in the first threshold compressive force may be achieved by altering the dimensions of projections 300 or through use of a differing of materials. Additionally, the number of projections 300 per unit area of substrate 200 may vary between applications or within an individual area of material 100'.

With respect to footwear, one suitable set of dimensions is as follows: (a) the diameter of first edge 313 (otherwise referred to as the width of base portion 310) may fall within the range of 2 to 12 millimeters; (b) the distance from substrate 200 to fourth edge 324 (otherwise referred to as the height of projection 300) may fall within the range of 1 to 25 millimeters; (c) the distance from the plane on which third edge 323 is located to the plane on which fourth edge 324 is located (otherwise referred to as the height of spring portion 320) may fall within the range of 0.3 to 10 millimeters; (d) the angle formed between exterior surface 321 and the plane of substrate 200 may fall within the range of 10 and 80 degrees; (e) the angle formed between exterior surface 311 and the plane of substrate 200 may fall within the range of 45 and 90 degrees; and (f) the wall thickness of base portion 310 and spring portion 320 may fall within the range of 0.25 to 1.0 millimeters, with the range of 0.38 to 0.89 millimeters providing a particularly suitable overall response for projections 300.

The wall thickness ranges discussed above for base portion 310 and spring portion 320 are suitable for a variety of thermoplastic materials. When incorporated into an upper of an article of footwear, for example, projections 300 having wall thicknesses between 0.25 to 1.0 millimeters have a response that properly provides localized fit adjustment and enhanced comfort. Projections 300 with a wall thickness less than 0.25 millimeters are generally too compliant. Similarly, projections 300 with a wall thickness above 1.0 millimeter are generally too stiff. When material 100' is incorporated into other commodities, however, wall thicknesses beyond the range disclosed above may be utilized.

To improve the fit properties of an article of footwear, the adjustment of specific, localized areas of the footwear is beneficial. Often, the wearer is not aware that an adjustment is necessary until the footwear has been worn for an extended period of time, thereby causing discomfort or permitting areas of the wearer's foot to become blistered or chafed because significant, direct contact occurs between specific, localized areas of the footwear and the wearer's foot. Accordingly, an adjustment that occurs without the wearer's intervention or awareness is preferable. Material 100' permits such an adjustment.

FIG. 5A depicts a cross-sectional, schematic plan view of the relationship between a foot 510 and an upper 611 of an article of footwear 610 in which foot 510 is received. That is, FIG. 5A depicts foot 510 as being received within a foot cavity of footwear 610. The illustrated spacing between foot 510 and footwear 610 indicates a proper fit, which occurs when upper 611 of footwear 610 does not contact foot 510 in a manner that creates points of high pressure between foot 510 and the upper of footwear 610. In FIG. 5B, however, foot 520 makes significant, or high pressure, contact with an upper 621 of footwear 620 in locations 622 through 625, thereby indicating an improper fit between foot 520 and footwear 620. If the wearer of footwear 620 were to engage in a significant amount of activity while wearing footwear 620, discomfort, chafing, or blisters may occur in portions of foot 520 that correspond with locations 622 through 625.

With reference to FIG. 5C, a foot 530 is located within a foot cavity of an article of footwear 630 that includes material 100' incorporated into an upper 631. Note that footwear 630 makes significant, direct contact with foot 530 in locations 632 through 635. As the wearer of footwear 630 walks, runs, or otherwise uses footwear 630, foot 530 may press against locations 632 through 635 with a force that exceeds the first threshold compressive force of material 100'. Accordingly, the thickness of those portions of material 100' in locations 632 through 635 decreases, as depicted in FIG. 5D, thereby causing locations 632 through 635 to draw away from foot 530. In this manner, material 100' may be utilized to enhance comfort and reduce the probability of discomfort, in the form of chafing or blisters. FIG. 5E depicts a close-up view of location 633 to further demonstrate the manner in which material 100' deforms.

With reference to material 100', as depicted in FIGS. 5C and 5D, the size of projections 300 vary in different portions of footwear 630. Along the medial and lateral sides of footwear 630 projections 300 have a relatively narrow width. In the heel portion of footwear 630, however, projections 630 have a relatively wide width. Accordingly, the various dimensions of projections 300 may be varied to provide different levels of fit adjustment in different areas of footwear 630.

Figure 6A:
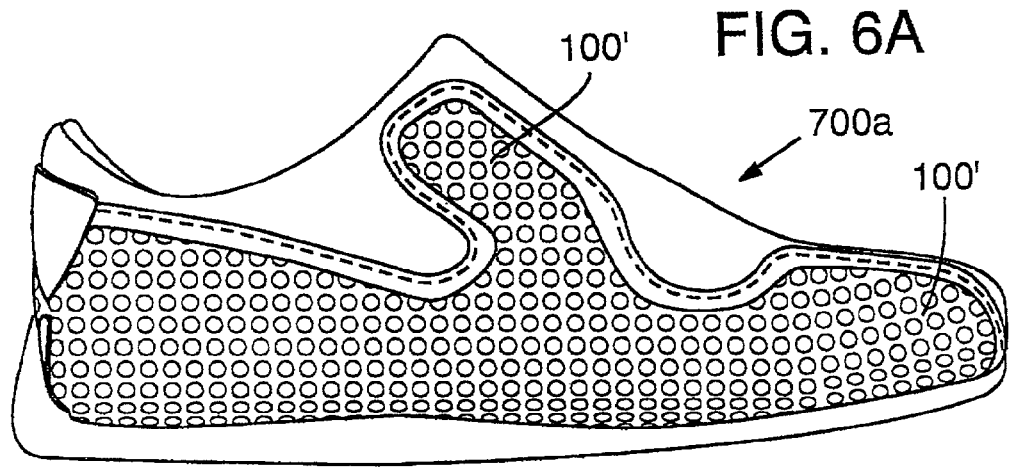
FIG. 6A is an elevational view of a first article of footwear incorporating the material of the present invention.
Figure 6B:
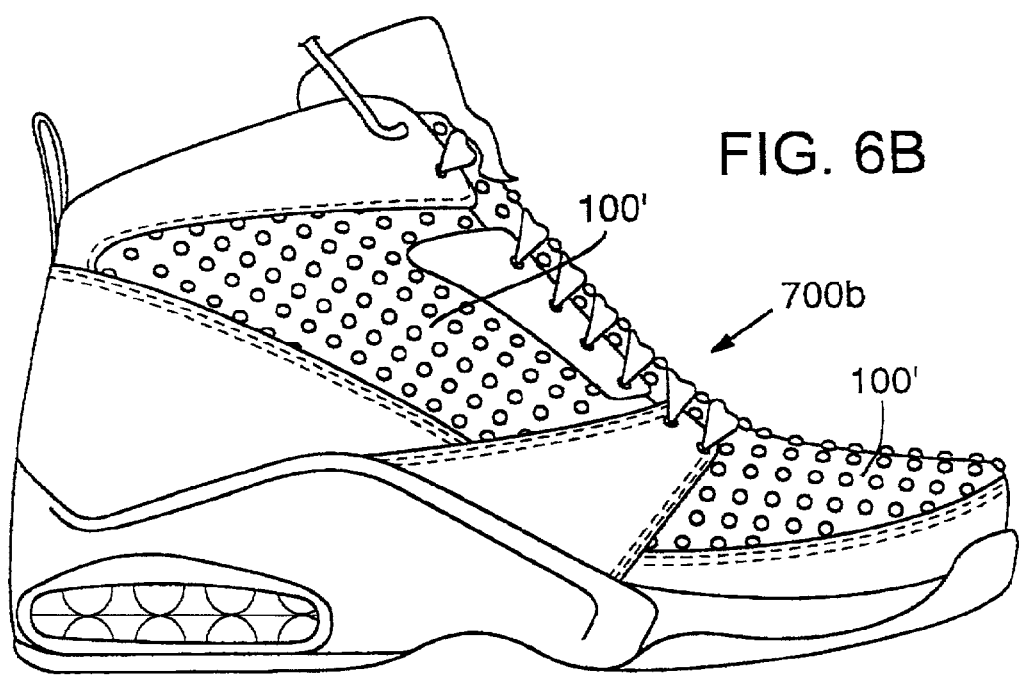
FIG. 6B is an elevational view of a second article of footwear incorporating the material of the present invention.
Figure 7A:
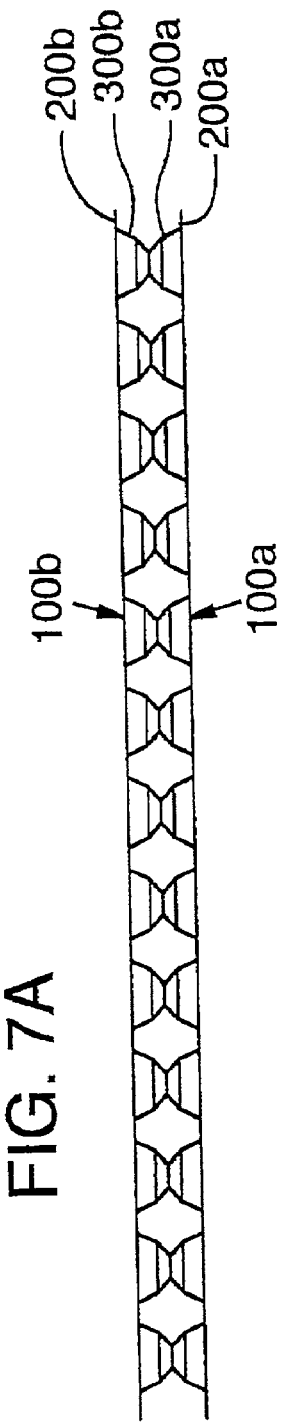
FIG. 7A is a side elevation view of a first embodiment having two superimposed and connected layers of the material.
Figure 7B:
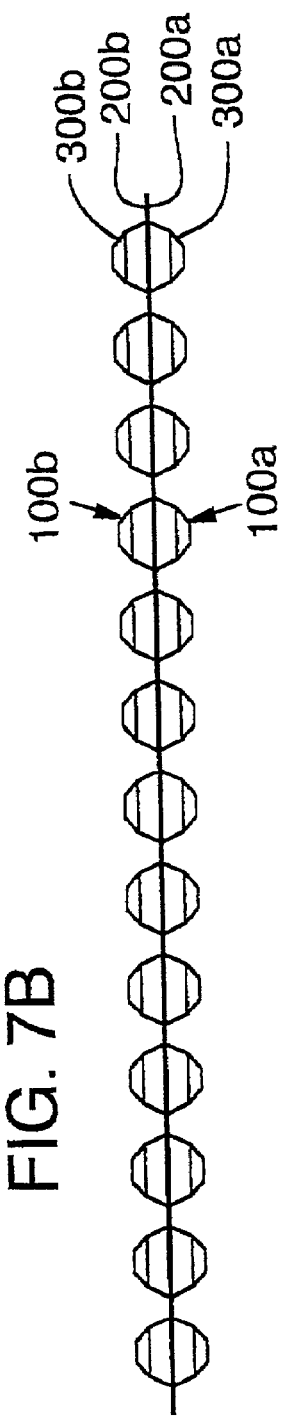
FIG. 7B is a side elevation view of a second embodiment having two superimposed and connected layers of the material.
Figure 7C:
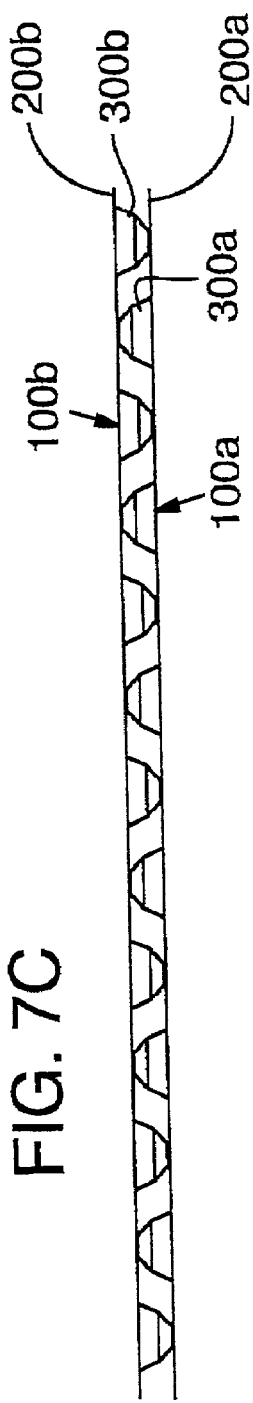
FIG. 7C is a side elevation view of a third embodiment having two superimposed and connected layers of the material.

The manner in which material 100' may be incorporated into products, such as footwear uppers, may vary significantly. FIG. 6A depicts a first article of footwear 700a, particularly an athletic shoe that is suitable for running, having an upper formed of material 100'. FIG. 6B depicts a second article of footwear 700b, a basketball shoe, that incorpoates material 100'. Although footwear 700a and 700b are both articles of athletic footwear, material 100 and material 100' may also be incorporated into non-athletic footwear, such as work boots, sandals, or loafers, for example. A conventional textile 640, as depicted in FIGS. 5C and 5D, may also be attached to one or more surfaces of material 100' to enhance comfort and absorb moisture, for example. In addition, two or more layers of material 100' may be superimposed and connected together to enhance the properties of material 100'. Referring to FIG. 7, embodiments that include two layers of material 100' are disclosed. FIG. 7A depicts two layers of material 100a' and 100b'. Material 100a' include a substrate 200a and a plurality of projections 300a, and material 100b' include a substrate 200b and a plurality of projections 300b. Materials 100a' and 100b' are superimposed such that substrate layers 200a and 200b are located on the exterior and projections 300a and 300b engage each other. A similar configuration is depicted in FIG. 7B, wherein substrate layers 200a and 200b are connected to each other and projections 300a and 300b face outward. In addition, two layers of material 100' may be connected such that projections 300 are in an off-set configuration, as depicted in FIG. 7C, wherein projections 300a are connected to substrate 200b, and projections 300b are connected to substrate 200a. Accordingly, multiple layers of material 100' may be utilized in combination.

A further example of an application in which material 100' may be utilized are straps for sporting goods, such as backpacks. In many instances, a backpack strap may place undue pressure upon a specific portion of the wearer's back, shoulder, or chest in a manner that has the potential to cause discomfort. By incorporating material 100' into the backpack strap, the thickness of the portion of the strap that has the potential to cause discomfort may be decreased, thereby relieving the pressure in the region of potential discomfort.

The present invention is disclosed above and in the accompanying drawings with reference to a variety of embodiments. The purpose served by disclosure of the embodiments, however, is to provide an example of the various aspects embodied in the invention, not to limit the scope of the invention. One skilled in the art will recognize that numerous variations and modifications may be made to the embodiments without departing from the scope of the present invention, as defined by the appended claims.

That which is claimed is:

1. An article of footwear having an upper and a sole, at least one of the upper and the sole comprising a polymer sheet material having a plurality of projections extending outward from a substrate, at least one of the projections including:
    a base portion positioned immediately adjacent the substrate, the base portion having a configuration of a single truncated cone with a first slope relative to the substrate; and
    a spring portion positioned immediately adjacent the base portion to form a terminal end of the at least one of the projections, the spring portion having a configuration of a single truncated cone with a second slope relative to the substrate, the first slope being greater than the second slope.

2. The article of footwear recited in claim 1, wherein the base portion is hollow to define a recess within the base portion.

3. The article of footwear recited in claim 1, wherein the spring portion deflects into the recess in the base portion when the at least one of the projections is compressed.

4. The article of footwear recited in claim 1, wherein the spring portion has a configuration of a belleville spring.

5. The article of footwear of claim 1, wherein a wall thickness of the base portion and the spring portion is in a range of 0.25 to 1.0 millimeters.

6. The article of footwear of claim 1, wherein the projections have a height in a range of 1 to 25 millimeters.

7. An article of footwear having an upper and a sole, at least one of the upper and the sole comprising a polymer sheet material having at least one projection extending outward from a substrate, the projection including:
    a base portion in contact with the substrate, the base portion having a substantially hollow interior, and
    a spring portion in contact with the base portion and located opposite the substrate, the spring portion forming a terminal end of the at least one of the projections, each of the base portion end the spring portion having a configuration of a single truncated cone, a slope of a wall of the base portion being rester than a slope of a wall of the spring portion, the projection having a first configuration when uncompressed and a second configuration when compressed, the spring portion being located outside the hollow interior of the base portion in the first configuration, and the spring portion being located within the hollow interior of the base portion in the second configuration.

8. The article of footwear recited in claim 7, wherein the spring portion has a configuration of a belleville spring.

9. The article of footwear of claim 7, wherein walls of the spring portion and the base portion have a thickness in a range of 0.25 to 1.0 millimeters.

10. The article of footwear of claim 9, wherein the projection has a height in a range at 1 to 25 millimeters.

11. An article of footwear having an upper and a sole, at least one of the upper and the sole comprising a sheet of polymer material that defines a substrate and at least one projection extending outward from the substrate, the projection having:
    a base portion positioned adjacent to the substrate, the base portion having a substantially hollow interior; and
    a spring portion that forms an end of the projection, the spring portion being positioned adjacent to the base portion and opposite the substrate,
the projection having a first configuration when uncompressed and a second configuration when compressed, the spring portion being located outside the hallow interior of the base portion in the first configuration, and the spring portion being located within the hollow interior of the base portion in the second configuration, wherein the projection:
    remains in the first configuration when a compressive force acting upon the projection is less than a first threshold;
    converts to the second configuration when the compressive force is greater than the first threshold, a thickness of the projection in the second configuration being less than a thickness of the projection in the first configuration;
    remains in the second configuration when the compressive force is less than the first threshold and greater than a second threshold, the second threshold being less than the first threshold; and
    returns to the first configuration when the compressive force is reduced below the second threshold.

12. The article of footwear recited in claim 11, wherein the base portion has a first slope relative to the substrate, and the spring portion has a second slope relative to the substrate.

13. The article of footwear recited in claim 12, wherein an obtuse angle is formed between the first slope of the base portion and the second slope of the spring portion.

14. The article of footwear recited in claim 12, wherein the first slope is greater than the second slope.

15. The article of footwear recited in claim 11, wherein at least one of the base portion and the spring portion have a configuration of a truncated cone.

16. The article of footwear recited in claim 11, wherein the base portion has a configuration of a first truncated cone, and the spring portions has a configuration of a second truncated cone.

17. The article of footwear recited in claim 11, wherein the spring portion has a configuration of a belleville spring.

18. An article of footwear having an upper ends sole, at least one of the upper and the sole incorporating a material consisting of:

a substrate formed from a thermoplastic sheet; and a plurality of projections protruding from the substrate and formed as a portion of the thermoplastic sheet at least a portion of the projections consisting of a pair of stacked truncated cones.

19. The article of footwear recited in claim 18, wherein an angle formed by exterior surfaces of the pair of stacked truncated cones is obtuse.

20. The article of footwear recited in claim 18, wherein at least one of the pair of stacked truncated cones has a configuration of a belleville spring.

21. The article of footwear of claim 18, wherein a wall thickness of the pair of stacked truncated cones is in a range of 0.25 to 1.0 millimeters, and a height of the plurality of projections is in a range of 1 to 25 millimeters.

22. An article of footwear having an upper and a sole, at least one of the upper and the sole incorporating a material consisting of:

a substrate formed from a thermoplastic sheet; and a plurality of projections protruding from the substrate and formed as a portion of the thermoplastic sheet, at least a portion of the projections consisting of:

a base portion positioned immediately adjacent the substrate, the base portion having a configuration of a single truncated cone with a first slope relative to the substrate, and a spring portion positioned immediately adjacent the base portion to form a terminal end of the at least one of the projections, the base portion having a configuration of a single truncated cone with a second slope relative to the substrate, the first slope being greater than the second slope.

23. The article of footwear recited in claim 22, wherein the base portion is hollow to define a recess within the base portion.

24. The article of footwear recited in claim 22, wherein the spring portion deflects into the recess in the base portion when compressed.

25. The article of footwear recited in claim 22, wherein the spring portion has a configuration of a belleville spring.

* * * * *

UNITED STATES PATENT AND TRADEMARK OFFICE
CERTIFICATE OF CORRECTION

| | | |
|---|---|---|
| PATENT NO. | : 7,089,690 B2 | Page 1 of 1 |
| APPLICATION NO. | : 10/158204 | |
| DATED | : August 15, 2006 | |
| INVENTOR(S) | : Ruzica Krstic | |

It is certified that error appears in the above-identified patent and that said Letters Patent is hereby corrected as shown below:

Column 11, line 63, change "rester" to --greater--.

Signed and Sealed this

Seventeenth Day of October, 2006

JON W. DUDAS
*Director of the United States Patent and Trademark Office*